(12) United States Patent
Stevens et al.

(10) Patent No.: US 7,810,391 B2
(45) Date of Patent: Oct. 12, 2010

(54) AERODYNAMIC HOOD LIFT AND DEFLECTION MEASUREMENT DEVICE

(75) Inventors: Kim Stevens, Columbus, OH (US);
Thomas Ramsay, Worthington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 13 days.

(21) Appl. No.: 12/418,274

(22) Filed: Apr. 3, 2009

(65) Prior Publication Data

US 2009/0255330 A1   Oct. 15, 2009

Related U.S. Application Data

(60) Provisional application No. 61/042,524, filed on Apr. 4, 2008.

(51) Int. Cl.
*G01M 9/00* (2006.01)
(52) U.S. Cl. .................................................. 73/147
(58) Field of Classification Search .............. 73/147; 296/91, 136.08, 180.01
See application file for complete search history.

(56) References Cited

U.S. PATENT DOCUMENTS

| 4,783,994 | A | | 11/1988 | Ashby, Jr. | |
|---|---|---|---|---|---|
| 4,787,666 | A | * | 11/1988 | Noel | 296/180.1 |
| 4,896,532 | A | | 1/1990 | Schmalz | |
| 4,920,791 | A | | 5/1990 | Griffin | |
| 5,039,156 | A | * | 8/1991 | Messmore et al. | 296/91 |
| 5,056,361 | A | | 10/1991 | Roberts | |
| 5,233,865 | A | | 8/1993 | Rossow | |
| 5,341,676 | A | | 8/1994 | Gouterman et al. | |
| 5,341,677 | A | * | 8/1994 | Maris | 73/147 |
| 5,513,526 | A | | 5/1996 | Lefebvre et al. | |
| 5,924,756 | A | * | 7/1999 | Homa | 296/91 |
| 6,058,769 | A | | 5/2000 | Corriveau et al. | |
| 6,526,821 | B1 | | 3/2003 | Corda et al. | |
| 7,028,542 | B2 | | 4/2006 | Metni | |
| 7,310,998 | B2 | | 12/2007 | Schwetzler et al. | |
| 2006/0266106 | A1 | | 11/2006 | Glauser et al. | |

* cited by examiner

*Primary Examiner*—Jewel Thompson
(74) *Attorney, Agent, or Firm*—Mark E. Duell; Rankin, Hill & Clark LLP

(57) ABSTRACT

An aerodynamic hood lift deflection measurement device includes an airfoil body mounted to a front vehicle fender such that a portion of the airfoil body held over the vehicle hood. A laser measurement device is secured to the airfoil body in a position so as to be directly over the vehicle hood. The airfoil body is mounted at an angle such that a length direction of the airfoil body is parallel to an air flow direction. The resultant disruption of the air flow surrounding the vehicle hood is minimized due to the shape and positioning of the measurement device.

20 Claims, 7 Drawing Sheets

AERODYNAMIC HOOD LIFT AND DEFLECTION MEASUREMENT DEVICE

CROSS-REFERENCE TO RELATED APPLICATIONS

This application claims priority to U.S. Provisional Application No. 61/042,524, filed on Apr. 4, 2008, the entirety of which is incorporated herein.

BACKGROUND OF THE INVENTION

1. Field of the Invention

The present invention is directed to an aerodynamic hood lift deflection measuring device, which is used to measure deflection of a vehicle hood in a wind tunnel.

2. Description of the Related Art

With the increase in gasoline prices, the interest in creating more fuel efficient vehicles has risen dramatically. Among the innovations used to increase fuel efficiency, designers have sought to reduce the weight of vehicles by using lower weight vehicle parts. Of particular interest in the present application is the use of lower weight vehicle hoods.

The vehicle hood (hereinafter, "hood") may be reduced in weight by either redesigning the underlying structure or changing the material. However, in altering the hood to reduce weight, the hood must still conform with aerodynamic deflection standards and safety requirements. To test the hood lift or deflection, aerodynamic loads are applied to the hood by placing the vehicle in a full-scale wind tunnel and directing an airflow of 160 km/hr over the vehicle. During application of the airflow, the hood lift or deflection is measured.

The measurement of the hood deflection is performed using a laser measurement device. Ideally, the measurement device would be placed underneath the hood in the engine compartment so as to eliminate an aerodynamic footprint of the measurement device. However, space limitations in the engine compartment preclude this location for the measurement device. Therefore, the measurement device is mounted on the exterior of the vehicle, and conventionally on a front fender of the vehicle.

With reference to FIGS. 1A-1D, a conventional measurement device 10 is shown to include a base plate 12, a support leg 14, an arrow-shaped body 16, and a laser device 18. The base plate 12 is secured to a vehicle front fender 20 (hereinafter, "fender"). The fender 20 has a sloped shape extending from a side of a hood 22 and curving downward toward the ground. To ensure a proper attachment, the base plate 12 is similarly curved so as to follow the contour of the front fender 20. The base plate 12 is ideally secured to the fender 20 using an adhesive, though mechanical fasteners or welding can be used.

The support leg 14 extends vertically upward from a hood-adjacent edge of the base plate 12. The support leg 14 is a generally rectangular member that connects the base plate 12 to the arrow-shaped body 16. To ensure stability of the measurement device 10 during testing, the base plate 12, the support leg 14, and the arrow-shaped body 16 are integrally formed as a unitary body, ideally made from aluminum or steel. Alternatively, the measurement device can be formed of a hard polymer.

The arrow-shaped body 16 is disposed at an upper portion of the vertical support leg 14 so as to be vertically spaced from the base plate 12. As shown in FIG. 1D, a top surface of the arrow-shaped body 16 is flush with a top surface of the support leg 14. As the name suggests, when viewed from a top (as in FIG. 1C), the arrow-shaped body 16 has an arrow shape with a relatively narrow rectangular back portion 26 and a triangular front portion 28. A rear wall of the triangular front portion 28 extends laterally from a front wall of the rectangular back portion 26.

An outer sidewall of the narrow rectangular back portion 26 of the arrow-shaped body 16 is integrated with a vertical sidewall of the upper portion of the support leg 14. As such, the arrow-shaped body is disposed over an edge of the hood 22.

The laser device 18 is received within a space defined by an inner sidewall of the rectangular back portion 26 of the arrow-shaped body 16. The laser device 18 has a generally rectangular shaped body shaped and sized to be received within the space provided in the rectangular back portion 26 of the arrow-shaped body 16. The laser device 18 includes an optical opening (not shown) along a bottom surface that is directed toward the vehicle hood 22. A laser beam is directed from the optical opening toward the hood 22 and reflected from the hood 22 back to the laser device 18 so as to measure a distance from the optical opening to the hood 22, as is well known in art of laser measurement.

In this regard, it is noted that since the support leg 14 extends vertically upward from the hood-adjacent edge of the base plate 12, is integrated with the rectangular back portion 26 of the arrow-shaped body 16 along the outer sidewall of the rectangular back portion 26, and the laser device 18 is secured to the inner sidewall of the rectangular back portion 26, the laser device 18 is spaced laterally from the base plate 12 and the fender 20. Therefore, a space between the bottom of the laser device 18 and the hood 22 is unobstructed by the base plate 12.

It is further noted that edges of the base plate 12, the support leg 14, and the rectangular back portion 26 are all substantially parallel with one another. As shown in FIGS. 1A and 1E, when the measurement device 10 is mounted on the vehicle fender 20, the measurement device 10 is pointed in a direction that is substantially parallel with a forward/rearward direction of the vehicle.

While the conventional measurement device 10 is capable of measuring hood deflection upon the application of a sustained air flow, there are several drawbacks to the conventional design. With reference to FIGS. 1E and 6B, the conventional measurement device 10 secured to the front fender 20 is illustrated, with a representative air flow passing over the front fender 20 and the hood 22 with the measurement device 10 secured thereto. FIG. 6A illustrates the air flow over the same region without a measurement device affixed thereto. As is readily ascertained from the air flow pattern following the measurement device 10, the measurement device 10 disrupts the air flow, causing a discontinuation of the air flow upon the air flow contacting the measurement device 10. This discontinuation is illustrated by showing a tail region immediately behind the measurement device 10 as having no airflow passing therethrough. As such, the air flow surrounding this tail region has an increased air flow density.

With reference to FIGS. 8A and 8B, the resultant negative pressure on the hood is shown. FIG. 8A illustrates local negative pressures on the hood when a measurement device is not affixed to the fender. FIG. 8B illustrates local negative pressures on the hood when the conventional measurement device 10 is affixed to the fender. The central region of the local pressure distribution shown in FIG. 8B is the area where the conventional measurement device 10 is located. As shown, the local negative pressure distribution on the hood in the area surrounding the measurement device 10 is greatly disturbed by the presence of the measurement device 10. As such, accurate measurement of the hood lift deflection is not readily ascertainable, as real world conditions are not precisely replicated.

Two features of the conventional measurement device 10 are considered to significantly contribute to the disruption of the air flow. The first is the shape of the measurement device 10. While the arrow-shape does allow the device to somewhat cut through the air flow, the shape is not sufficiently aerodynamic for the present application. The second feature is the positioning of the measurement device relative to the direction of the air flow over the vehicle hood and fender. As illustrated in FIG. 7, the air flow over the edge of the vehicle hood and fender is angled relative to a straight forward/rearward direction of the vehicle. As such, by positioning the conventional measurement device parallel to the straight forward/rearward direction of the vehicle, the device actually interacts with the air flow at an angle. The surface area of the measurement device relative to the air flow is thereby increased, increasing the disruption of the air flow by the measurement device.

Accordingly, there is a need in the art for a hood deflection measurement device that reduces the effect of itself on the air flow, and thereby allows for a more accurate measurement of hood lift or deflection caused by the air flow.

SUMMARY OF THE INVENTION

The present invention is directed to a hood deflection measuring device that solves or minimizes the problems associated with conventional hood deflection measurement devices. Particularly, the present invention is directed to a hood deflection measuring device that minimizes the disruption and effect on the air flow field caused by the measuring device. The present invention is further directed toward a measuring device that more accurately replicates real world conditions in terms of hood lift or deflection caused by pressure exerted due to an air flow.

The hood deflection measuring device according to the present invention includes an airfoil body that is mounted on a vehicle front fender so as to have at least a portion of the airfoil body disposed over the vehicle hood. The airfoil body houses a laser measuring device in the portion of the airfoil body that is disposed over the vehicle hood. The laser measuring device is pointed downward toward the hood so as to measure a deflection of the hood when the hood is exposed to a forced air flow.

Further, an airfoil body with a splitter is provided. The splitter is a planar body that extends orthogonally from a bottom surface of the airfoil body. The splitter has a circumference that is larger than the airfoil body circumference and has a shape that is substantially identical to that of the airfoil body when viewed from above, such that the splitter is concentric with the airfoil body.

The airfoil body, with or without the splitter, is mounted to a vehicle fender using a base plate secured to the fender and a support leg that extends between the base plate and the airfoil body.

BRIEF DESCRIPTION OF THE DRAWINGS

These and other features of the present invention will be described with reference to the exemplary embodiments illustrated in the appended drawings.

DETAILED DESCRIPTION OF THE INVENTION

The present invention will be described with reference to the appended drawings to simplify the explanation and to facilitate the understanding of the invention. However, the description with reference to the drawings is not considered to limit the invention to the exemplary embodiments illustrated therein. One skilled in the art would recognize that the present invention is amenable to various modifications and additions, while still being within the scope of the present disclosure.

Figure 2A:
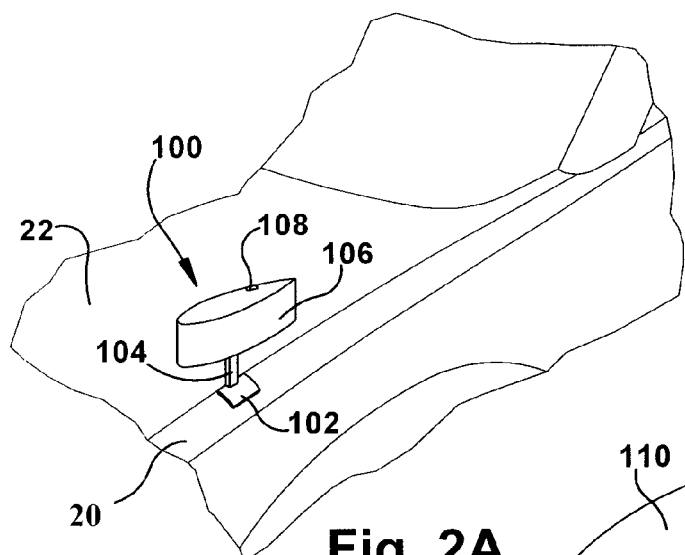
FIG. 2A is a perspective view of a first embodiment of the hood deflection measurement device of the present invention secured to the vehicle fender.
Figure 2B:
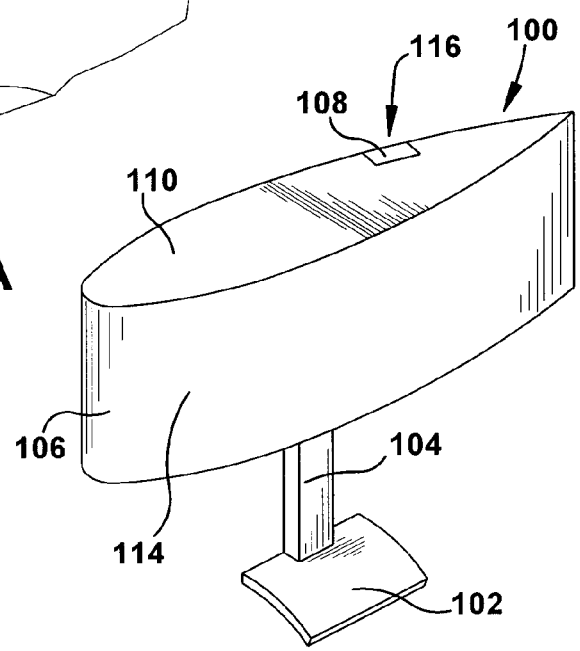
FIG. 2B is a perspective view of the first embodiment of the hood deflection measurement device of the present invention.
Figure 2C:
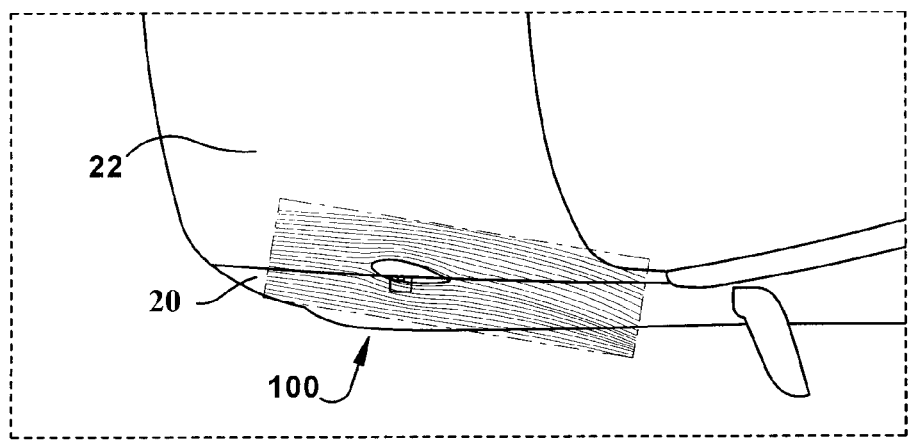
FIG. 2C schematically air flow around the hood deflection measurement device of the present invention.

With reference to FIGS. 2A-2C and 3A-3D, an exemplary embodiment of a hood deflection measuring device 100 (hereinafter, "device") is illustrated. As shown in FIGS. 2A and 2C, the device 100 is mounted to a vehicle front fender 20 in a position adjacent to a vehicle hood 22. The device 100 includes a base plate 102, a support leg 104, an airfoil body 106, and a laser measuring device 108 (hereinafter, "laser"). The base plate 102, the support leg 104, and the airfoil body 106 are ideally formed of aluminum. However, a suitable alternative material, such as steel or a hard polymer, may be used in place of aluminum. Further, the base plate 102, the support leg 104, and the airfoil body 106 are integrally formed as a unitary piece with one another, preferably by being machined from a single block of material, or by being cast or molded in one or more shots. Alternatively, the base plate 102, the support leg 104, and the airfoil body 106 can be separate and joined with one another through any conventional means, such as through the use of welding, adhesives, or mechanical fasteners. The laser 108 is received by and mounted to the airfoil body 106, as will be described in further detail below.

The base plate 102 has a generally rectangular shape when viewed from above (FIGS. 3A and 3D), and has an inner edge portion that sits along an inner edge of the fender 20, immediately adjacent to the hood 22. The inner edge portion of the base plate 102 extends substantially parallel with an outer, adjacent edge of the hood 22. From the inner edge portion, the base plate 102 extends away from the hood 22 and tapers downwards toward an outer edge portion of the base plate 102, tracing an arc corresponding to a downward slope of the fender 20. Accordingly, a full surface area of a bottom of the base plate 102 is in contact with the fender 20. Preferably, the base plate 102 is secured to the fender 20 through the use of an adhesive. However, the base plate 102 can also be secured to the fender through the use of mechanical fasteners or welding. As the base plate 102 is integrally formed with the support leg 104 and the airfoil body 106, the device 100 is mounted to the fender 20 via the base plate 102.

The support leg 104 extends vertically upward from the base plate 102, and has a rectangular cross section from any of the top (FIG. 3A), side (FIGS. 3B and 3C), and bottom (FIG. 3D) views. A bottom of the support leg 104 extends from the inner edge portion of the base plate 102, such that an inner surface of the support leg 104 is substantially aligned with the inner edge of the base plate 102. Further, the support leg 104 is substantially centrally disposed in a forward/rearward direction of the base plate 102. A top of the support leg 104 merges into a bottom surface of the airfoil body 106.

The airfoil body 106 has a generally airfoil shape. As used herein, an airfoil shape means a generally oval or elliptical shaped body when viewed from the top or bottom. The front end of the airfoil shape is gently rounded and widens to apex points. The apex points are generally located at a front third of the airfoil shape. From the apex points, the airfoil shape tapers to a rear point. The airfoil shape further includes a sidewall connecting top and bottom surfaces of the airfoil. The sidewall is disposed so as to be perpendicular to the top and bottom surfaces.

Figure 3A:
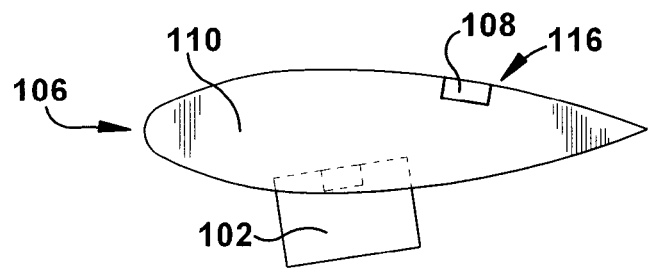
FIG. 3A is a top plan view of the first embodiment of the hood deflection measurement device of the present invention.
Figure 3B:
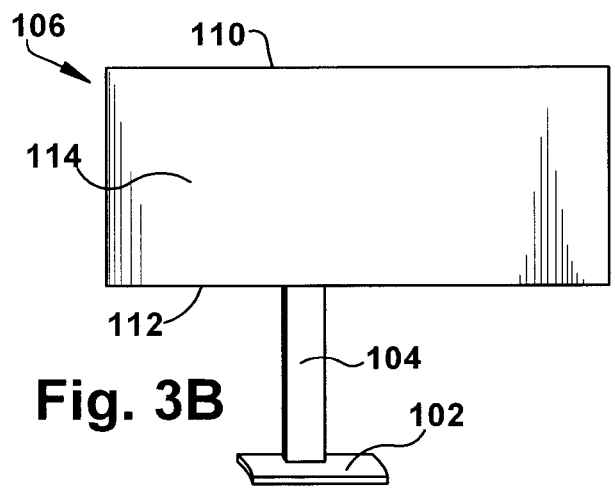
FIG. 3B is an outer side elevational view of the first embodiment of the hood deflection measurement device of the present invention.
Figure 3C:
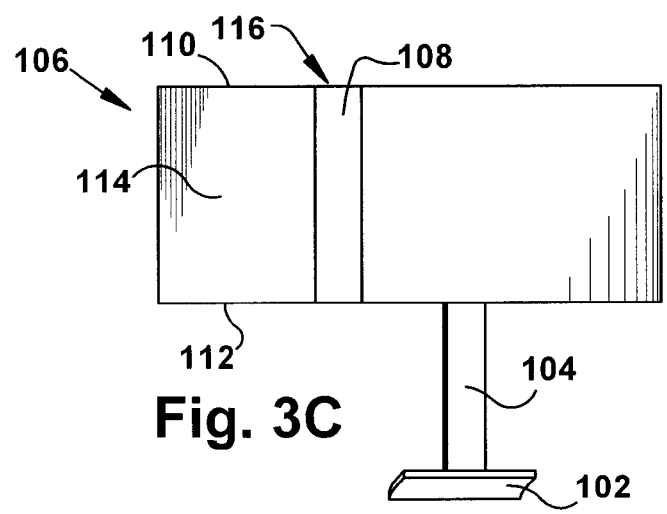
FIG. 3C is an inner elevational side view of the first embodiment of the hood deflection measurement device of the present invention.
Figure 3D:
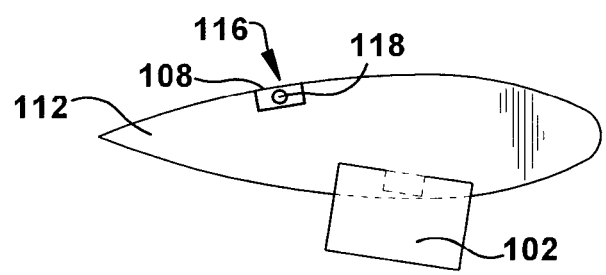
FIG. 3D is a bottom plan view of the first embodiment of the hood deflection measurement device of the present invention.
Figure 4A:
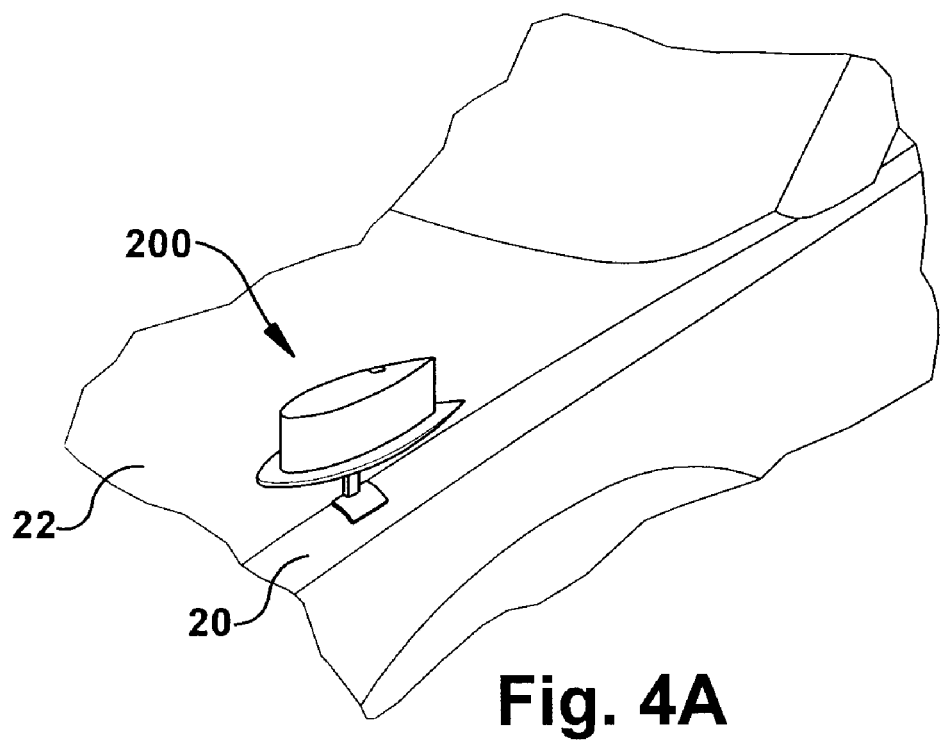
FIG. 4A is a perspective view of a second embodiment of the hood deflection measurement device of the present invention secured to the vehicle fender.
Figure 4B:
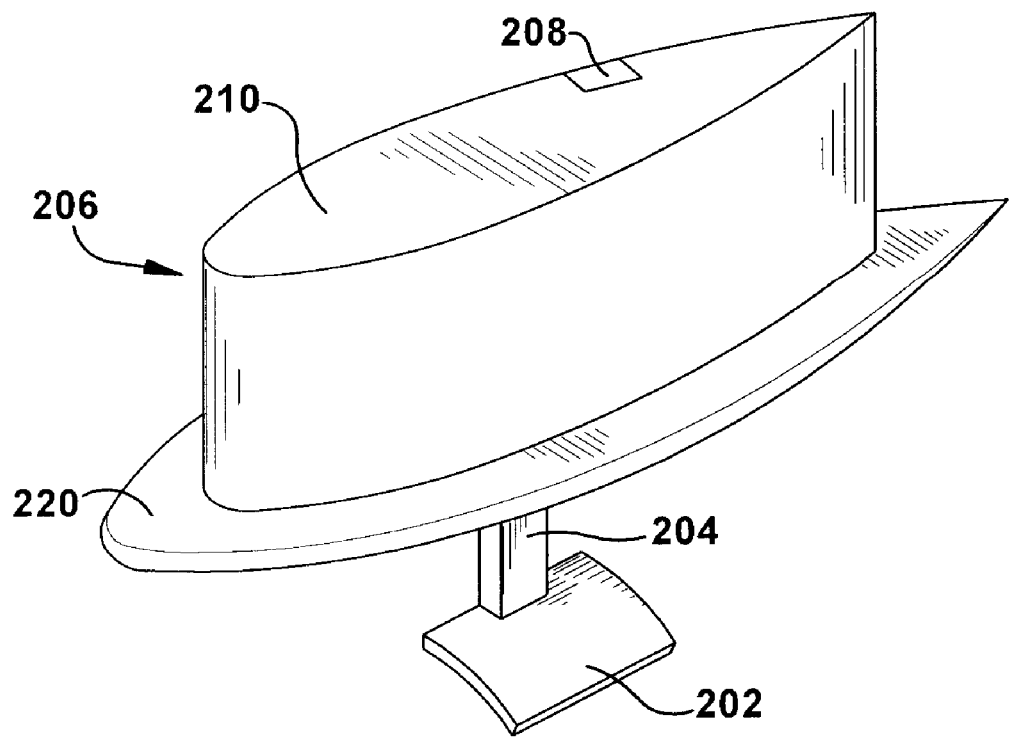
FIG. 4B is a perspective view of the second embodiment of the hood deflection measurement device of the present invention.
Figure 5A:
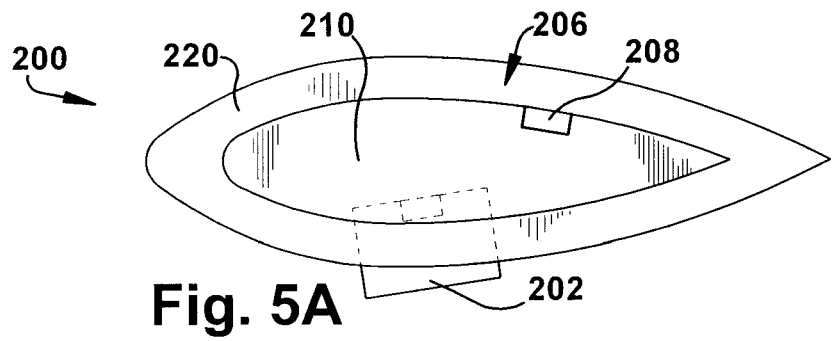
FIG. 5A is a top plan view of the second embodiment of the hood deflection measurement device of the present invention.
Figure 5B:
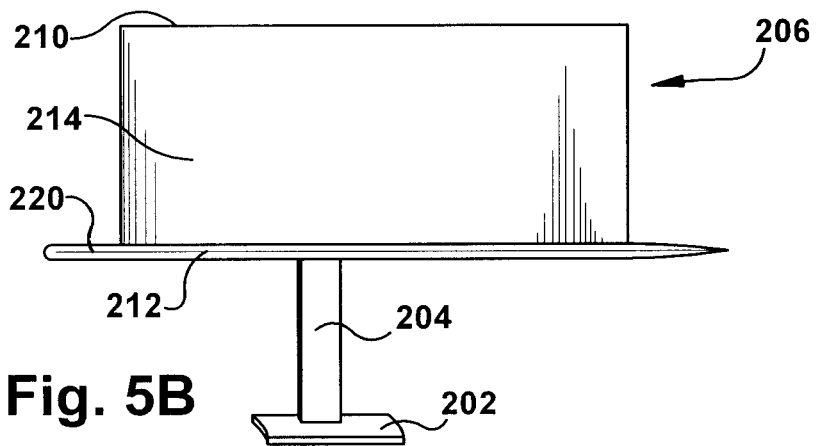
FIG. 5B is an outer elevational side view of the second embodiment of the hood deflection measurement device of the present invention.
Figure 5C:
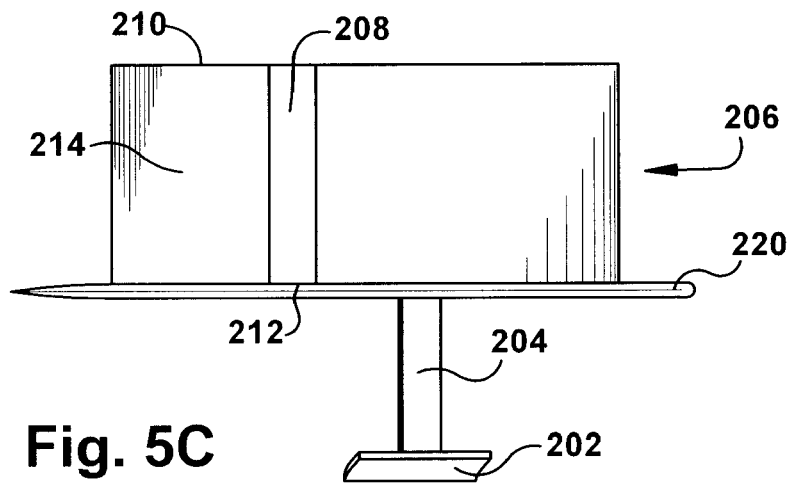
FIG. 5C is an inner elevational side view of the second embodiment of the hood deflection measurement device of the present invention.
Figure 5D:
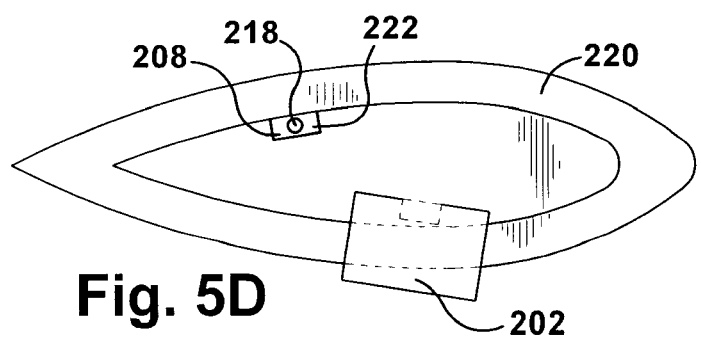
FIG. 5D is a bottom plan view of the second embodiment of the hood deflection measurement device of the present invention.

With reference to FIGS. 3A and 3D, the airfoil body 106 having the airfoil shape is shown. When viewed from above and below, the airfoil body 106 is generally tear-shaped. The side view of FIGS. 3B and 3C shows a generally rectangular shape. Specifically, the airfoil shape of the airfoil body 106 includes a planar top surface 110 and a planar bottom surface 112 that are parallel with each other and perpendicular to an airfoil side surface 114, which connects the top and bottom surfaces 110, 112.

The airfoil body 106 is positioned at an inward angle, toward the hood 22, relative to the base plate 102 and the support arm 104. The angular disposition of the airfoil body 106 is shown in FIGS. 2C, 3A, and 3D. The precise angle of the airfoil body 106 is experimentally determined such that the airfoil body 106 is in line with the air flow at the position the device 100 is mounted to the fender 20. Specifically, a centerline, defined by a point centrally disposed on the front end of the airfoil body 106 and the point at the rear end of the airfoil body 106, is substantially parallel to the air flow path, as shown in FIG. 2C. Generally, the airfoil body 106 is offset approximately 10° relative to the straight line in the forward/rearward direction. Alternatively, the airfoil body 106 can be mounted without an angular offset relative to the base plate 102 and the support arm 104. In this case, the base plate 102 would be mounted to the fender 20 so as to provide the necessary angular offset of the airfoil body 106.

The airfoil body 106 also defines a laser channel 116 in the top surface 110 and the bottom surface 112. The laser channel 116 extends between the top and bottom surfaces 110, 112 through the side surface 114 on an inner side of the airfoil body 106, and is at a location that is disposed over the hood 22.

In this regard, the laser 108 forms a portion of the smooth side surface 114 of the airfoil body 106. The laser 108 includes a casing that will fill the laser channel 116 and will continue a flush, smooth side surface 114 of the airfoil body 106. Thus, the laser 108 of the present invention is held in a casing that has planar top and bottom surfaces that are parallel with one another. When viewed from the top or bottom, the laser 108 has first and second edges that are parallel with one another, a third edge connecting the first and second edges that is perpendicular to the first and second edges, and a fourth edge opposite to the third edge that is curved to correspond to the shape of the airfoil body 106.

The laser 108 has a height dimension equal to that of the airfoil body side surface 114. Accordingly, when received in the laser channel 116, the laser 108 fills the laser channel 116 and is flush with the top and bottom surfaces 110, 112 of the airfoil body 106. Further, by providing the laser channel 116 as a rectangular cut-out, the first, second, and third edges of the laser 108 are received in the laser channel 116 without leaving any gap. The sloped edge of the laser 108 connects opposite airfoil body side surface 114 ridges, forming a smooth side surface 114 face. Accordingly, the laser 108 is received in the airfoil body 106 without adversely affecting the aerodynamic properties of the airfoil body 106.

Preferably, the laser 108 is secured in the laser channel 116 using an adhesive. However, alternative means of securing the laser 108 in the laser channel 116 can be used. The alternative means include mechanical fasteners, welding, detent mechanisms, and frictional engagement.

With reference to FIG. 3D, an optical opening 118 is provided on the bottom surface of the laser 108. The optical opening 118 allows a laser beam to travel between the laser 108 and the hood 22. The laser 108 monitors the distance traveled by the laser beam, thereby measuring the distance from the optical opening 118, which is aligned with the bottom surface 112 of the airfoil body 106, and the hood 22. Accordingly, the hood deflection is measured.

In this regard, it is noted that the mounting of the device 100 can be accomplished in ways other than those specifically described herein. However, to measure the hood deflection, the laser 108 must be mounted directly over the hood 22. Thus, the present invention illustrates the support leg 104 meeting the bottom surface 112 of the airfoil body 106 at a position disposed toward an outer edge of the airfoil body 106. As such, the bulk of the airfoil body 106 is held directly over the hood 22.

To minimize the impact of the device 100 on the air flow, it is generally desirable to minimize the width of the airfoil body 106. Therefore, the laser 108 is mounted on a far, inner edge of the airfoil body 106 to maximize the distance between the laser 108 and base plate 102 and the fender 20. However, the laser 108 need not be mounted as disclosed above. Rather, the laser 108 can be mounted centrally within a hole formed in the airfoil body 106. With such an arrangement, the position of the hole must be made so as to be over the hood 22, rather than the fender 20 or the base plate 102.

Further, properties of the laser 108 affect the dimensions of the device 100. Particularly, the height of the support leg 104 is set based on the sensitivity of the laser 108. The greater the sensitivity of the laser 108, the longer the support leg 104 can be. Conversely, if the laser 108 is relatively insensitive, the support leg 104 can be shorter. The longer the support leg 104, the less of an effect the device 100 is going to have on the air flow relative to the hood 22.

However, to the extent that laser sensitivity is increased, the cost of the laser 108 will similarly increase. Thus, cost restraints limit the height of the support leg 104 by limiting the sensitivity of the laser 108. However, by slightly modifying the exemplary embodiment, similar results to elevating the support leg 104 can be achieved. With reference to FIGS. 4A, 4B, and 5A-5D, a measurement device with a splitter 200 (hereinafter, "splitter device") is illustrated.

The splitter device 200 is formed of a base plate 202, a support leg 204, an airfoil body 206 having a splitter 220, and a laser measuring device 208 (hereinafter, "laser"). The base plate 202 and the support leg 204 are identical to the base plate 102 and support leg 104 of the prior embodiment. Further, the airfoil body 206 is generally identical to the airfoil body 106 of the prior embodiment. The only difference in the present exemplary embodiment is that the airfoil body 206 includes the splitter 220. The splitter 220 is disposed on a bottom surface of the airfoil body 212, and merges with the support leg 204.

The splitter 220 is a planar, plate-like member that, when viewed from a top view, has a peripheral shape identical to that of the airfoil body 206. However, the splitter 220 has a larger circumference than that of the airfoil body 206, and therefore orthogonally extends from the bottom surface 212 of the airfoil body 206. Further, to accommodate the laser 208, a laser opening 222 is formed through the splitter 220 so as to allow the laser 208 and a laser optical opening 218 to be exposed to the hood 22.

Thus, this embodiment of the present invention is substantially identical to the prior embodiment, but for the inclusion of the splitter. The splitter 220 is a planar member that extends orthogonally outward from the bottom portion of the airfoil body. The inclusion of the splitter 220 further reduces the aerodynamic effects of the hood lift deflection measurement device, and provides results similar to those observed by further elongating the support leg and elevating the airfoil body.

The present invention allows for increased accuracy in measuring hood lift deflection caused by an air flow acting on the hood. The increased accuracy is a result of minimizing the impact of the measurement device on the air flow field. Specifically, when the air flow field is disrupted due to the presence of an obstruction that will not be present during normal vehicle operation, the real world resultant pressure on the vehicle hood is not accurately simulated and the hood deflection is inaccurate. Further, to the extent that the measurement device is less aerodynamic, the air flow will produce a resultant force on the measurement device itself. As a result, the apparatus may be deflected backwards and outboard. Consequently, the distance between the laser and the hood is increased, reducing the accuracy of the measurement of hood deflection.

Figure 6A:
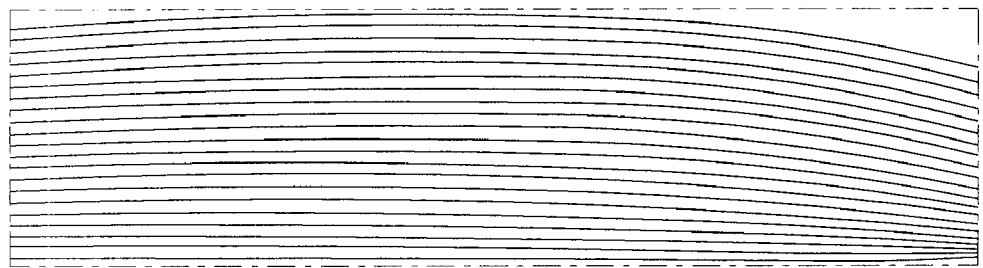
FIG. 6A illustrates air flow path a hood deflection measurement device.
Figure 6B:
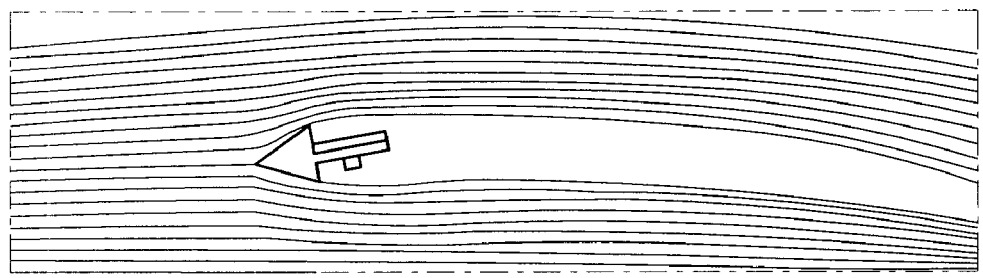
FIG. 6B illustrates air flow with a conventional hood deflection measurement device.
Figure 6C:
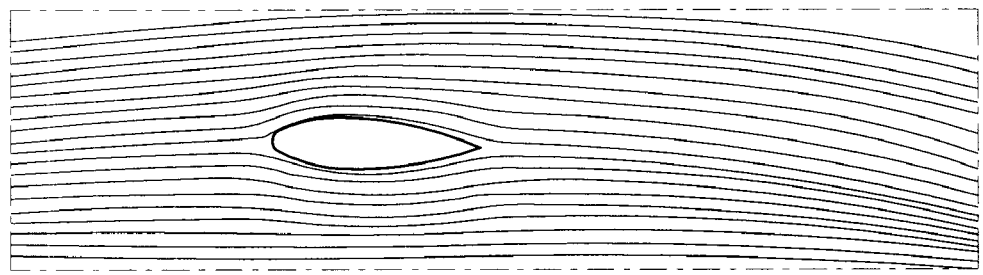
FIG. 6C illustrates air flow with a hood deflection measurement device according to the present invention.
Figure 7:
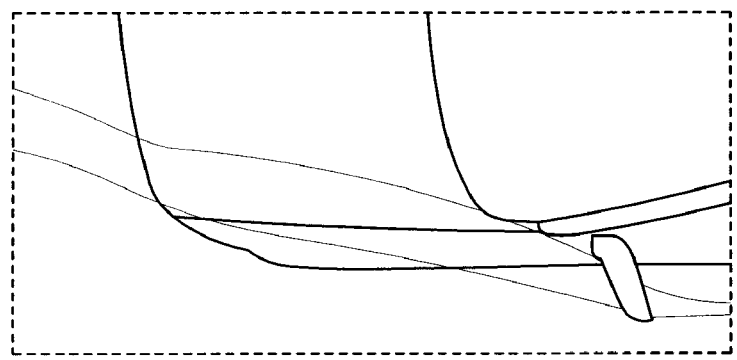
FIG. 7 illustrates air flow over a vehicle hood and fender.

With reference to FIGS. 6A-6C, the air flow pattern is illustrated. FIG. 6A shows the air flow pattern over the vehicle hood when the measurement device is not mounted to the vehicle fender. The thin lines represent the air flow, and are shown as being undisrupted throughout.

Figure 1A:
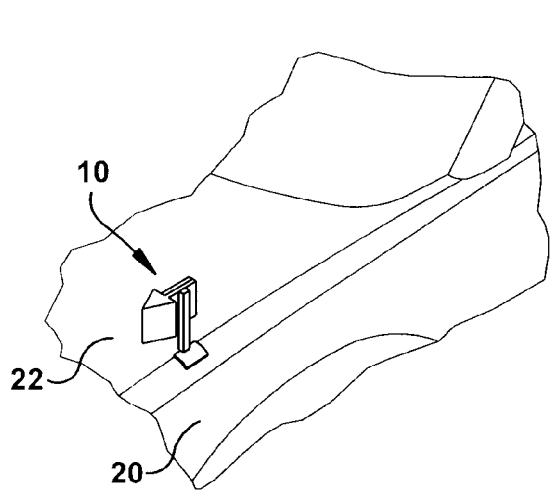
FIG. 1A is a perspective view of a conventional hood deflection measurement device secured to a vehicle fender.
Figure 1B:
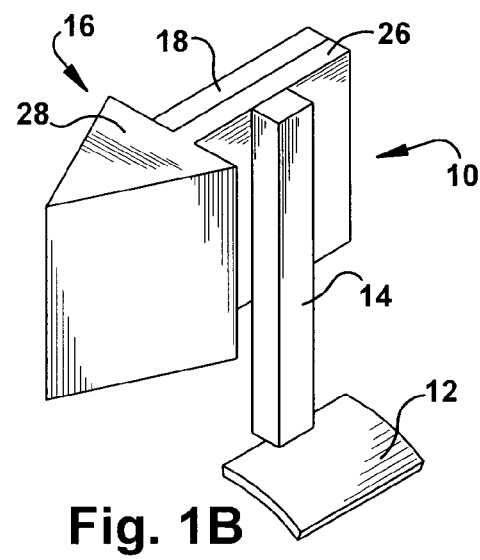
FIG. 1B is a perspective view of the conventional hood deflection measurement device.
Figure 1C:
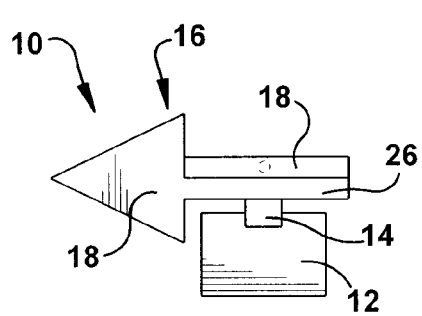
FIG. 1C is a top view of the conventional hood deflection measurement device.
Figure 1D:
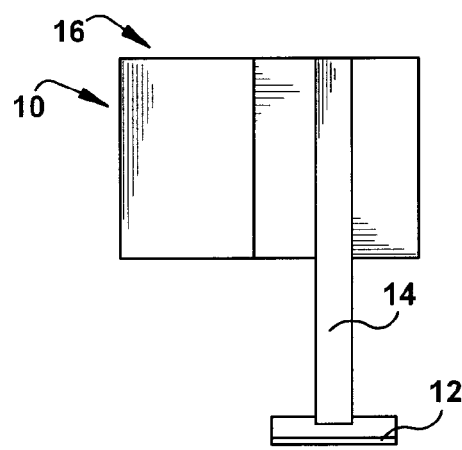
FIG. 1D is a side view of the conventional hood deflection measurement device.
Figure 1E:
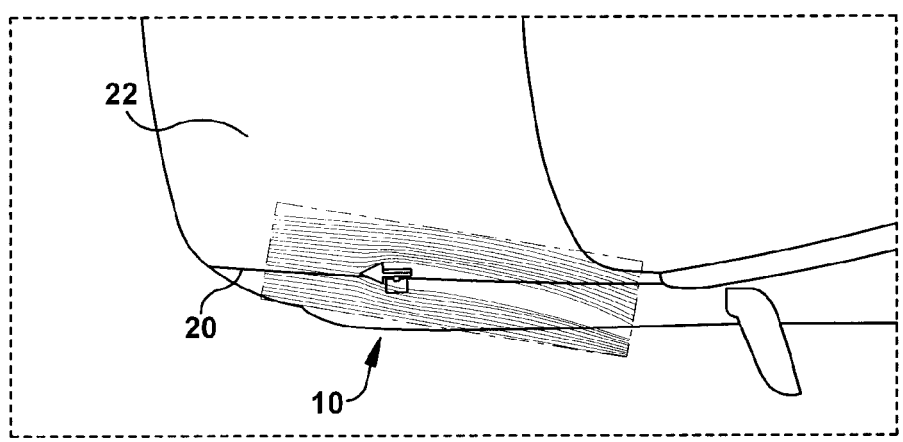
FIG. 1E schematically illustrates air flow around the conventional hood deflection measurement device while the device is secured to the vehicle fender.

In contrast, FIGS. 1E and 6B show the air flow pattern over the vehicle hood in the vicinity of the conventional measurement device. As shown therein, the air flow pattern is significantly disrupted due to the presence of the conventional measurement device. Specifically, when the air flow reaches the measurement device, the air flow is severely deflected so as to travel around the measurement device.

The deflection is accentuated by the angle of the measurement device relative to the direction of travel of the air flow. Specifically, the exposed surface area of the measurement device is increased in relation to the direction of travel of the air flow, thereby increasing the size of the obstruction in the path of the air flow.

Further, while the arrow-shaped front portion of the conventional measurement device somewhat eases the deflection of the air flow, the abrupt discontinuation at the back portion of the triangle causes the air flow to continue traveling in the line tangential to the path of travel at the point the triangle portion ceases to deflect. As such, a large tail exists behind the conventional measurement device wherein there is no air flow. As the volume of air flow is not, in and of itself, diminished, areas of high density air flow immediately surrounding the large tail are created. These areas of high density air flow distort the measured hood deflection as a result of applying acutely higher pressures on the hood in pointed locations.

FIGS. 2C and 6C illustrate the air flow pattern over the vehicle hood when the hood deflection measurement device of the present invention is secured to the vehicle fender. As illustrated, the air flow pattern around both the first and second embodiments of the present invention is nearly identical. While differences exist, and the second embodiment provides an improved device, the differences are primarily found in an upward and downward direction, and not seen in the horizontal air flow around the devices. Therefore, a single illustration is presented for both embodiments, and is considered descriptive of an airfoil body, both with and without a splitter.

It is initially noted that the airfoil body of the present invention has a length direction that is substantially parallel with the direction of travel of the air flow. As such, the surface area of the measurement device that initially contacts the air flow is reduced. Further, the airfoil body gently tapers to an apex point, so as to result in less of a deflection of the air flow as the air flow runs past the front end of the airfoil body. From the apex point, the airfoil body gently tapers to a back point, thus easing the air flow back into alignment following passing the measurement device. As such, the measurement device of the present invention does not result in a large tail, as does the conventional device. As can be ascertained by comparing FIGS. 6A and 6C, the present invention produces an air flow field that is similar to the air flow field when there is not measurement device present.

Figure 8A:
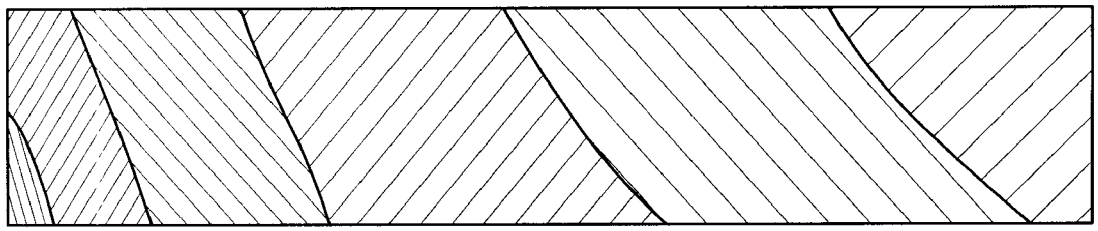
FIG. 8A graphically illustrates a negative pressure distribution over a vehicle hood without a hood deflection measurement device secured to the fender.

As a result of minimizing the disruption of the air flow field, the negative pressure distribution detected on the vehicle hood is brought into closer conformity with the negative pressure distribution that exists when there is no measurement device present. With reference to FIGS. 8A-8D, the negative pressure distributions on the vehicle hood are shown under different circumstances. FIG. 8A shows the negative pressure distribution when the hood deflection measurement device is not present. In the figures, a higher line density indicates a higher negative (upward) pressure on the vehicle hood.

Figure 8B:
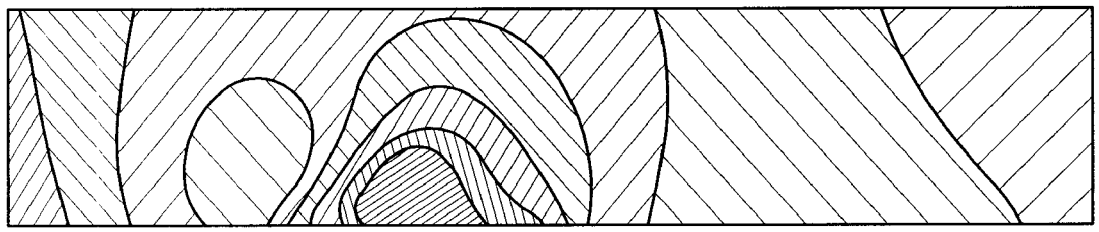
FIG. 8B graphically illustrates a negative pressure distribution over a vehicle hood with a conventional hood deflection measurement device secured to the fender.

FIG. 8B shows the negative pressure distribution on the vehicle hood when the conventional hood deflection measurement device is mounted. As shown therein, the area surrounding the measurement device is easily discernable as having a significant disruption of the negative pressure distribution as compared with the situation in which a measurement device is not present (FIG. 8A). A correlation coefficient, as compared to a target value of 1.0 when no device is present, is 0.811.

Figure 8C:
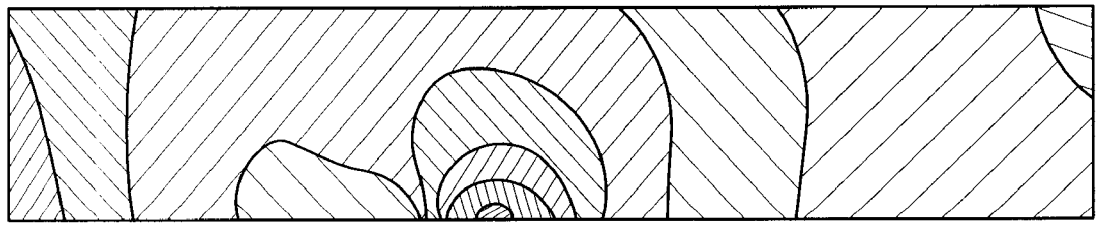
FIG. 8C graphically illustrates a negative pressure distribution over a vehicle hood with a hood deflection measurement device according to the first embodiment of the present invention secured to the fender.

FIG. 8C shows the negative pressure distribution on the vehicle hood when the hood deflection measurement device with an airfoil without a splitter is mounted thereon. As can be seen, the disruption of the negative pressure distribution is significantly reduced as compared with what is found with the conventional device. The correlation coefficient for the airfoil body design is 0.880, a marked improvement over the conventional device.

Figure 8D:
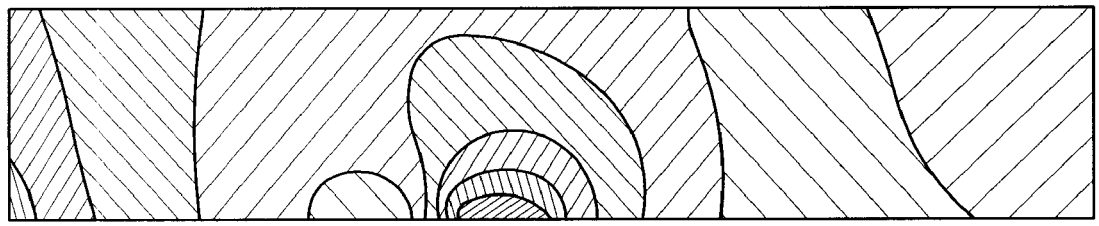
FIG. 8D graphically illustrates a negative pressure distribution over a vehicle hood with a hood deflection measurement device according to the second embodiment of the present invention secured to the fender.

FIG. 8D shows the negative pressure distribution on the vehicle hood that is detected when the hood deflection measurement device using an air foil with a splitter is mounted thereon. The distribution shows an improvement (reduced disruption in negative pressure distribution) in the area in front of and behind the measurement device on the hood. Particularly, the sizes of the effected regions are minimized when using an airfoil body with a splitter. The correlation coefficient for the airfoil body with a splitter design is 0.889, a marked improvement over the conventional device, and an improvement over the airfoil body without the splitter.

Again, the present invention has been described in reference to exemplary embodiments. However, the embodiments are considered to be exemplary, and the invention is not considered to be limited to the specific description of the assemblies described herein. Various modifications can be made to the manner in which the airfoil body is mounted to the vehicle. Further, the manner of securing the laser device can also be modified, preferably only so as to reduce, minimize, or eliminate the affect on the passing air flow by the laser device.

What is claimed is:

1. A hood lift deflection measuring device, comprising:
    an airfoil body having an airfoil shape, said airfoil body having a laser measuring device mounted therein, said airfoil body mounted to a vehicle such that a portion of the airfoil body is held over a hood of the vehicle, and wherein the laser measuring device is mounted to said portion and held directly over the vehicle hood.

2. The hood lift deflection measuring device according to claim 1, wherein the airfoil body is disposed at a predetermined angle relative to a forward/rearward direction of the vehicle, wherein said predetermined angle is set such that an air flow direction at a position of the airfoil body is parallel to a length direction of the airfoil body.

3. The hood lift deflection measuring device according to claim 1, wherein the device further comprises:
    a base plate adapted to be mounted to a vehicle fender in a position adjacent to the vehicle hood; and
    a support leg extending vertically from an inner portion of the base plate,
    wherein, the support leg connects the base plate to the airfoil body.

4. The hood lift deflection measuring device according to claim 3, wherein the airfoil body, the support leg, and the base plate are integrally formed as a unitary structure.

5. The hood lift deflection measuring device according to claim 3, wherein the airfoil body comprises:
    a planar top surface having a rounded front end and tapering to a narrow point at a rear end;
    a planar bottom surface that is shaped identically to the planar top surface and disposed parallel to the top surface; and
    a side surface connecting the planar top surface to the planar bottom surface.

6. The hood lift deflection measuring device according to claim 1, wherein the airfoil body defines a laser space into which is received the laser measuring device such that an interval between an optical opening on a bottom of the laser measuring device and the vehicle hood is unobstructed.

7. The hood lift deflection measuring device according to claim 4, wherein the airfoil body defines a laser space into which is received the laser measuring device such that an interval between an optical opening on a bottom of the laser measuring device and the vehicle hood is unobstructed.

8. The hood lift deflection measuring device according to claim 1, further comprising:
    a splitter extending orthogonally from a bottom surface of the airfoil body, wherein the splitter is a planar member having a circumference that is greater than that of the airfoil body and a peripheral shape similar to that of the airfoil body.

9. The hood lift deflection measuring device according to claim 8, wherein the airfoil body defines a laser space into which is received the laser measuring device such that an interval between an optical opening on a bottom of the laser measuring device and the vehicle hood is unobstructed, and
    the splitter defines an opening therethrough in a position corresponding to the optical opening of the laser measuring device.

10. The hood lift deflection measuring device according to claim 4, further comprising:
    a splitter integrally formed with the airfoil body extending orthogonally from a bottom surface of the airfoil body, wherein the splitter is a planar member having a circumference that is greater than that of the airfoil body and a shape similar to the airfoil body.

11. The hood lift deflection measuring device according to claim 10, wherein the airfoil body defines a laser space into which is received the laser measuring device such that an interval between an optical opening on a bottom of the laser measuring device and the vehicle hood is unobstructed, and
    the splitter defines an opening therethrough in a position corresponding to the optical opening of the laser measuring device.

12. The hood lift deflection measuring device according to claim 6, wherein the laser space is a vertically extending channel defined in the airfoil body.

13. The hood lift deflection measuring device according to claim 7, wherein the laser space is a vertically extending channel defined in the airfoil body.

14. The hood lift deflection measuring device according to claim 9, wherein the laser space is a vertically extending channel defined in the airfoil body, and
the opening in the splitter is positioned in line with a bottom opening of the channel.

15. The hood lift deflection measuring device according to claim 11, wherein the laser space is a vertically extending channel defined in the airfoil body, and
the opening in the splitter is positioned in line with a bottom opening of the channel.

16. The hood lift deflection device according to claim 5, wherein the airfoil body defines a laser space into which is received the laser measuring device such that an interval between an optical opening on a bottom of the laser measuring device and the vehicle hood is unobstructed,
wherein the laser space is a vertically extending channel defined in the airfoil body so as to extend from the planar top surface to the planar bottom surface through the side surface.

17. The hood lift deflection device according to claim 16, wherein the laser space is defined such that vertically extending channel is defined by a U-shaped channel formed in a hood-adjacent side of the airfoil body.

18. A method for measuring a vehicle hood deflection, comprising the steps of:

providing a measuring device comprising an airfoil body and a laser measuring device;

mounting the measuring device to the vehicle such that a portion of the airfoil body is held over the vehicle hood, and the laser measuring device is directly over the vehicle hood;

directing a high speed air flow over the vehicle hood; and measuring the hood deflection using the laser measuring device.

19. The method according to claim 18, wherein the mounting step includes mounting the airfoil body at a predetermined angle relative to a forward/rearward direction of the vehicle, wherein said predetermined angle is set such that an air flow direction at a position of the airfoil body is parallel to a length direction of the airfoil body.

20. The method according to claim 18, wherein in the providing step, the airfoil body includes a splitter integrally formed therewith, the splitter extending orthogonally from a bottom surface of the airfoil body, wherein the splitter is a planar member having a circumference that is greater than that of the airfoil body and a peripheral shape similar to that of the airfoil body.

* * * * *